United States Patent
Bensussan et al.

(10) Patent No.: US 7,850,386 B2
(45) Date of Patent: Dec. 14, 2010

(54) TWO-AXIS SWIVEL JOINT

(75) Inventors: Bernard Bensussan, Monroe, CT (US);
William Fiebel, West Orange, NJ (US);
Adam Sanchez, Nutley, NJ (US)

(73) Assignee: Unger Marketing International, LLC, Bridgeport, CT (US)

(*) Notice: Subject to any disclaimer, the term of this patent is extended or adjusted under 35 U.S.C. 154(b) by 1092 days.

(21) Appl. No.: 10/896,246

(22) Filed: Jul. 21, 2004

(65) Prior Publication Data
US 2006/0018706 A1   Jan. 26, 2006

(51) Int. Cl.
*F16D 1/12* (2006.01)
(52) U.S. Cl. .................................. 403/53; 15/144.2
(58) Field of Classification Search ............ 15/144.1, 15/144.2; 403/53, 57, 58
See application file for complete search history.

(56) References Cited

U.S. PATENT DOCUMENTS

| 2,407,421 | A | | 9/1946 | Herold | |
| 3,358,313 | A | * | 12/1967 | Grimes, Sr. | 15/144.1 |
| 3,360,286 | A | | 12/1967 | Smyth | 287/14 |
| 3,362,037 | A | * | 1/1968 | Griffin | 15/144.1 |
| 3,692,369 | A | | 9/1972 | Chase | 306/19 |
| 3,778,860 | A | | 12/1973 | Thielen | 15/147 |
| 3,790,232 | A | | 2/1974 | Alvarez | 403/232 |
| 3,850,533 | A | | 11/1974 | Thielen | 403/58 |
| 3,991,431 | A | | 11/1976 | Thielen | 15/147 |
| 4,165,550 | A | | 8/1979 | Burke | 15/144 |
| 4,407,039 | A | | 10/1983 | Moss | 15/144 |
| 4,516,361 | A | | 5/1985 | Gringer | 51/392 |
| 4,648,738 | A | | 3/1987 | Thielen | 403/341 |
| 4,672,786 | A | | 6/1987 | Peppers | 51/241 |
| 4,845,603 | A | | 7/1989 | Shpigel | 362/427 |
| 4,852,210 | A | * | 8/1989 | Krajicek | 15/144.2 |
| 4,968,173 | A | | 11/1990 | Fujita | 403/57 |
| 5,333,347 | A | * | 8/1994 | Stranders | 15/144.2 |
| 5,596,787 | A | | 1/1997 | Stevens et al. | 15/220.1 |
| 5,815,878 | A | | 10/1998 | Murakami | 15/231 |
| 5,845,361 | A | | 12/1998 | Murakami | 15/231 |
| 5,876,141 | A | | 3/1999 | Hsu | 401/207 |
| 5,926,896 | A | | 7/1999 | Allemann et al. | 15/147.2 |
| 6,305,046 | B1 | | 10/2001 | Kingry et al. | 15/231 |
| 6,484,346 | B2 | | 11/2002 | Kingry et al. | 15/231 |
| 6,560,815 | B1 | | 5/2003 | Brennan et al. | 15/260 |
| 6,572,480 | B1 | | 6/2003 | Huang | 464/106 |
| 6,601,261 | B1 | | 8/2003 | Holt et al. | 15/228 |
| 2002/0078519 | A1 | | 6/2002 | Boothby | |

FOREIGN PATENT DOCUMENTS

| DE | 3502393 A1 | 7/1986 |
| DE | 3502696 A1 | 7/1986 |
| DE | 3634056 C1 | 1/1988 |
| DE | 29620863 U1 | 3/1997 |
| WO | WO 98/06316 | 2/1998 |
| WO | WO 01/12052 | 2/2001 |

* cited by examiner

*Primary Examiner*—Michael P Ferguson
(74) *Attorney, Agent, or Firm*—Ohlandt, Greeley, Ruggiero & Perle, L.L.P.

(57) ABSTRACT

A two-axis swivel joint having a wheel member and a shoulder member is provided. The wheel member is securable to a first implement so that the wheel member swivels about a first axis. The wheel member has a rim portion with a channel defined therein. The shoulder member is secured in the channel such that the shoulder member swivels with respect to the wheel member about a second axis.

18 Claims, 3 Drawing Sheets

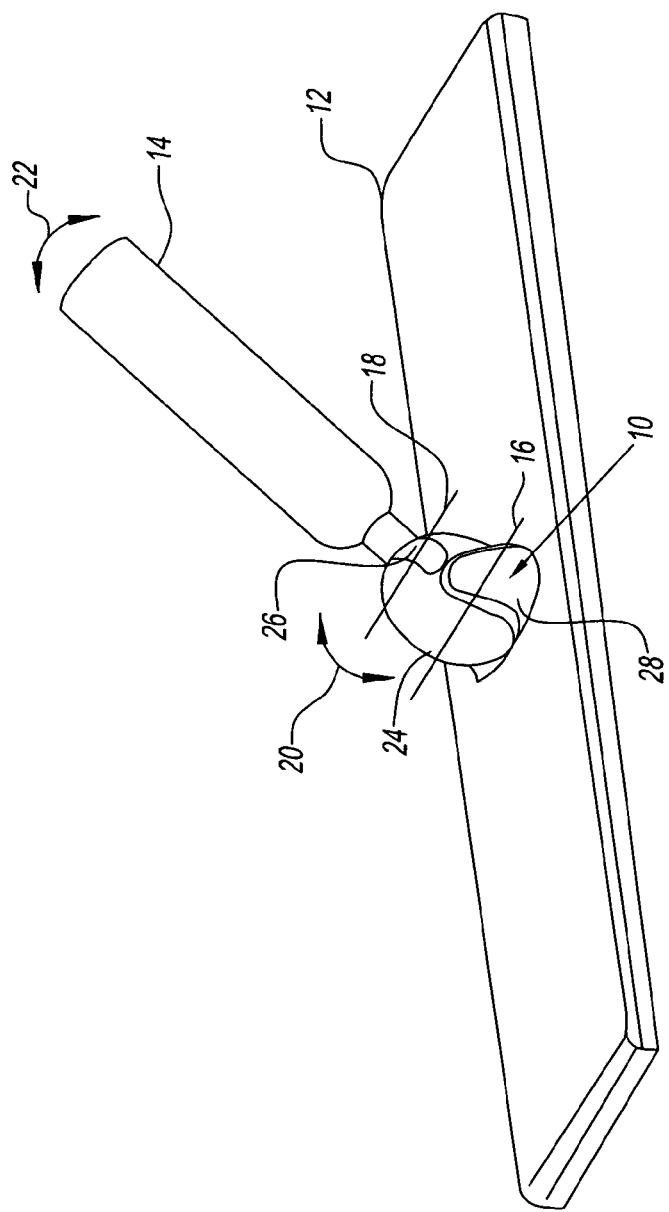
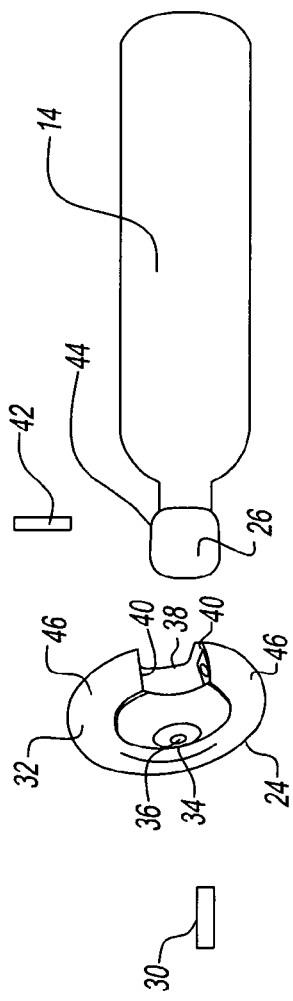

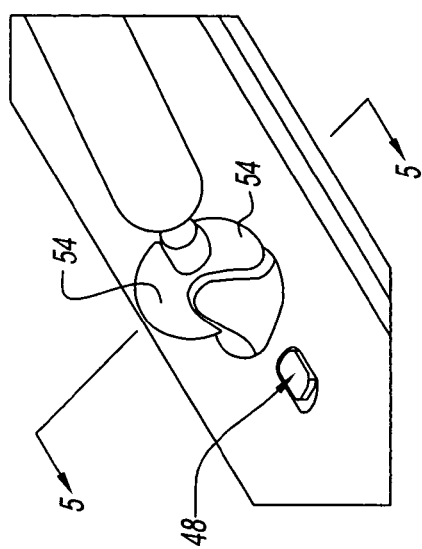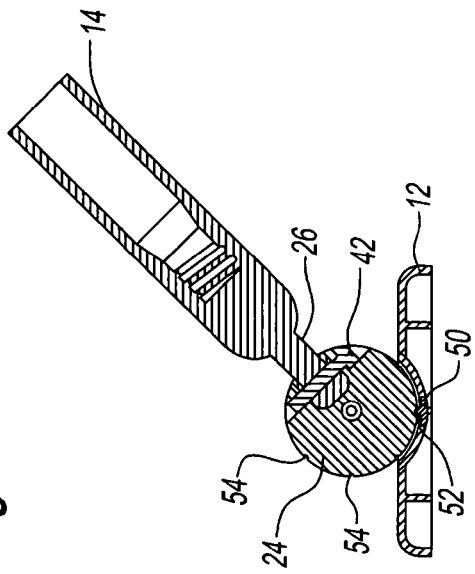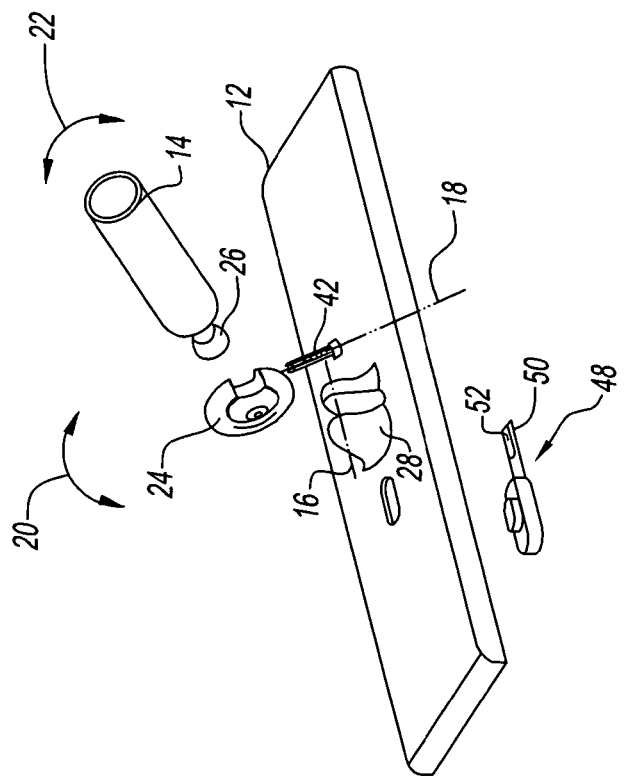

TWO-AXIS SWIVEL JOINT

BACKGROUND OF THE INVENTION

The present disclosure is related to swivel joints. More particularly, the present disclosure is related to two-axis swivel joints.

Joints that allow rotation about multiple axes are common. For example, joints that allow rotation about two axes, commonly referred to as universal joints, are known. Universal joints combine two hinges connected in series at right angles to one another.

Such universal joints have proven useful in transmitting torque from one shaft to another. More recently, universal joints have been used to join, for example, a tool and a handle to allow greater adjustment of the position of the tool with respect to the handle. Unfortunately, it has been found that universal joints provide less range of motion than is required in selected applications. In addition, it has been found that this type of two-hinge connection introduces binding points in the range of motion. The binding points are points where the rotation about one hinge is no longer possible without some movement in the about the second hinge.

Accordingly, it has been determined that there is a continuing need for two-axis swivel joints that alleviate, mitigate, and/or resolve one or more of the aforementioned deleterious effects of prior universal joints.

BRIEF SUMMARY OF THE INVENTION

It is an object of the present disclosure to provide a two-axis swivel joint.

It is another object to provide a joint for swiveling about a first axis and a second axis, where the joint has a range of motion about the second axis of at least one hundred eighty degrees.

It is still another object to provide a joint for swiveling about a first axis and a second axis, where the joint has a range of motion about the second axis of over three hundred degrees.

It is still a further object to provide a two-axis swivel joint that has a bind-free range of motion about both of its axes.

It is yet another object to provide a two-axis swivel joint, which can be selectively secured in one or more desired positions.

These and other objects and advantages of the present disclosure are provided by a two-axis swivel joint having a wheel member and a shoulder member. The wheel member is securable to a first implement so that the wheel member swivels about a first axis. The wheel member has a rim portion with a channel defined therein. The shoulder member is securable to a second implement. The shoulder member is secured in the channel such that the shoulder member swivels with respect to the wheel member about a second axis.

A two-axis swivel joint having a wheel member and a shoulder member is also provided. The wheel member is securable to a first implement so that the wheel member swivels about a first axis. The shoulder member is secured to the wheel member such that the shoulder member swivels with respect to the wheel member about a second axis. Here, the two-axis swivel joint has a range of motion about the second axis of over three hundred degrees.

A two-axis swivel joint is also provided that has a first member, a second member, and a stop device. The first member is securable to a first implement so that the first member swivels about a first axis. The second member is secured to the first member such that the first and second members swivel with respect to one another about a second axis. The stop device selectively inhibits and allows movement about an axis selected from the group consisting of the first axis, the second axis, and any combinations thereof.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 1 is a perspective view of a first exemplary embodiment of a two-axis swivel joint;

FIG. 2 is an exploded view of the joint of FIG. 1;

FIG. 3 is an exploded perspective view of a second exemplary embodiment of a two-axis swivel joint;

FIG. 4 is an assembled view of the joint of FIG. 3;

FIG. 5 is a sectional view of FIG. 4 taken along lines 5-5;

DETAILED DESCRIPTION OF THE INVENTION

Figure 6:
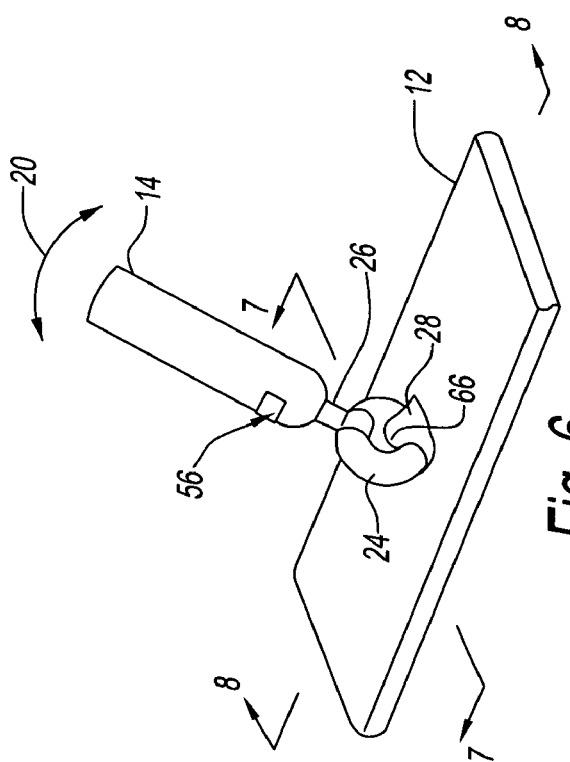
FIG. 6 is a perspective view of another exemplary embodiment of a two-axis swivel joint.

Referring to the drawings and in particular to FIGS. 1 and 2, an exemplary embodiment of a two-axis swivel joint according to the present disclosure generally represented by reference numeral 10 is illustrated. Joint 10 is illustrated connecting a first implement 12 and a second implement 14. In the illustrated embodiment, first implement 12 is a broom or mop head and second implement 14 is a handle or extension pole. Joint 10 is configured to allow first and second implements 12, 14 to swivel with respect to one another about a first axis 16 and a second axis 18.

Joint 10 swivels in a side-to-side direction 20 about first axis 16 and in a back-and-forth direction 22 about second axis 18. First axis 16 is offset with respect to second axis 18 such that the two axes do not intersect with one another.

Joint 10 has a wheel member 24 and a shoulder member 26. Wheel member 24 is configured to swivel in side-to-side direction 20 about first axis 16, while shoulder member 26 is configured to swivel in back-and-forth direction 22 about second axis 18. Thus, joint 10 allows first and second implements 12, 14 to swivel in the side-to-side and back-and-forth directions.

Of course, it is contemplated by the present disclosure for joint 10 to find use connecting other first and second implements 12, 14 to one another where movement in such side-to-side and back-and-forth directions 20, 22 is indicated.

Wheel member 24 is secured to first implement 12 such that the wheel member rotates about first axis 16. For example, wheel member 24 can be rotatably secured to first implement 12 by a suitable first anchoring mechanism, such as a set of lugs 28 and a pin 30. Here, wheel member 24 rotates in side-to-side direction 20 about pin 30, which is defined through first axis 16.

In the illustrated embodiment, wheel member 24 has a rim portion 32 and a hub portion 34. Hub portion 34 includes an opening 36 for receipt of pin 30. Opening 36 can be defined through the center of hub portion 34 such that first axis 16 is defined through the center of wheel member 24. Alternately, opening 36 can be off-center such that first axis 16 is not defined through the center of wheel member 24.

Of course, it is contemplated by the present disclosure for the first anchoring mechanism to be mechanisms other than lugs 28 and pin 30, which are suited to rotatably secure wheel member 24 to first implement 12.

Shoulder member 26 is secured to wheel member 24 such that the shoulder member swivels with respect to the wheel member about second axis 18. For example, rim portion 32 can include a channel 38 for receiving shoulder member 26. Channel 38 is defined in the outer periphery of wheel member 24 to define opposing sides 40 in rim portion 32. Shoulder member 26 can be rotatably secured by a suitable second anchoring mechanism, such as a screw 42, to wheel member 24. Shoulder member 26 includes an opening 44 for receipt of screw 42. In addition, wheel member 24 includes openings 46 defined in opposing sides 40 for receipt of screw 42. Thus, screw 42 is defined through second axis 18 so that shoulder member 26 rotates in back-and-forth direction 22 about the screw. Of course, it is contemplated by the present disclosure for the second anchoring mechanism to be mechanisms other than screw 42 that are suited to rotatably secure wheel and shoulder members 24, 26.

Accordingly, joint 10 can be used to swivel first and second implements 12, 14 with respect to one another about first and second axes 16, 18, respectively. It is contemplated by the present disclosure for lugs 28 to be integral with, secured to, or removably attached to first implement 12. Similarly, it is contemplated by the present disclosure for shoulder member 26 to be integral with, secured to, or removably attached to second implement 14.

Advantageously, wheel member 24 does not bind or interfere with other portions of joint 10, such as lugs 28 or shoulder member 24, during rotation about first axis 16. In addition, shoulder member 26 does not bind or interfere with other portions of joint 10, such as lugs 28 or wheel member 24, during rotation about second axis 18. Thus, joint 10 allows bind-free rotation in side-to-side direction 20 and back-and-forth direction 22.

In addition to allowing bind-free movement, joint 10 provides a large range of motion in both the side-to-side and back-and-forth directions 20, 22. For example, joint 10 allows second implement 14 to be moved in side-to-side direction 20 with respect to first implement 12 at least about one hundred eighty degrees. Further, joint 10 allows second implement 14 to be moved in back-and-forth direction 22 with respect to first implement 12 at least about one hundred eighty degrees in some positions and over three hundred degrees in other positions. For example, when joint 10 is rotated about first axis 16 such that first and second implements are parallel to one another, the joint allows the second implement to rotate at least about one hundred eighty degrees. However, when joint 10 is rotated about first axis 16 such that first and second implements are perpendicular to one another, the joint allows the second implement to rotate over three hundred degrees.

Referring now to FIGS. 3 through 5, another exemplary embodiment of joint 10 is illustrated. Here, joint 10 is configured to swivel in side-to-side direction 20 about second axis 18 and in back-and-forth direction 22 about first axis 16. In this embodiment, joint 10 allows second implement 14 to be moved in side-to-side direction 20 with respect to first implement 12 at least about one hundred eighty degrees. Further, joint 10 allows second implement 14 to be moved in back-and-forth direction 22 with respect to first implement 12 over three hundred degrees.

Joint 10 can include a first mechanism 48 for selectively securing the joint in a desired position about first axis 16. Thus, first mechanism 48 can selectively inhibit or allow rotation about first axis 16. For example, first mechanism 48 can include a stop portion 50 configured to selectively engage wheel member 24 and/or pin 30. Here, first mechanism 48 can be selectively moved between a first position (FIG. 5) where stop portion 50 is in contact with wheel member 24 and a second position (not shown) where the wheel member is free of the stop portion. Thus, stop portion 50 inhibits movement of wheel member 24 about first axis 16 when first mechanism 48 is in the first position but allows the wheel member to move freely about the first axis when in the second position.

Stop portion 50 can frictionally engage wheel member 24 and or pin 30 to inhibit movement of wheel member 24 about first axis 16. In other exemplary embodiments, stop portion 50 can include a detent 52 for engaging notches 54 defined in wheel member 24 to positively lock the wheel member in the desired position.

Figure 8:
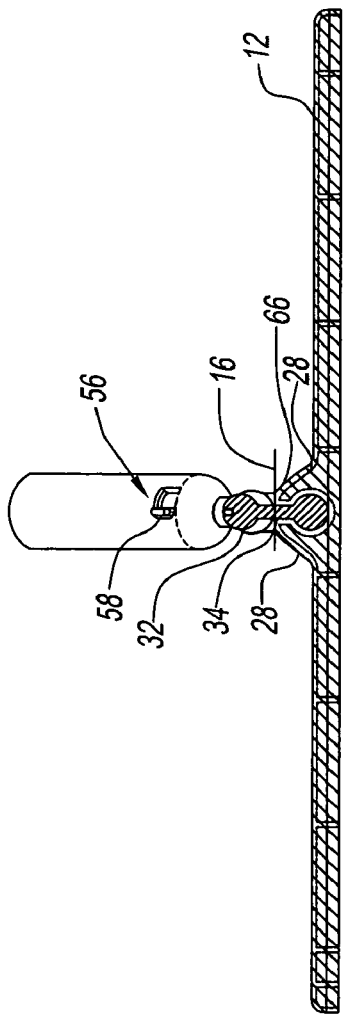
FIG. 8 is a sectional view of FIG. 6 taken along lines 8-8.
Figure 7:
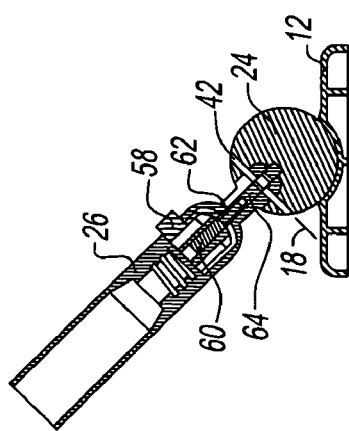
FIG. 7 is a sectional view of FIG. 6 taken along lines 7-7.

Referring now to FIGS. 6 through 8, yet another alternate exemplary embodiment of joint 10 is illustrated. Here, joint 10 can include a second mechanism 56 for selectively securing the joint in a desired position about second axis 18. Second mechanism 56 can selectively inhibit or allow movement of shoulder member 26 with respect to wheel member 24.

For example, second mechanism 56 can include a stop collar 58, a plunger screw 60, a plunger spring 62, and a plunger 64. Here, stop collar 58 can be selectively moved between a first position (FIG. 7) and a second position (illustrated in phantom in FIG. 8). Stop collar 58 is threadably engaged with plunger screw 60 such that the lateral movement of the stop collar is translated into vertical movement of the plunger screw. In this manner, second mechanism 56 inhibits movement of shoulder member 26 about second axis 18 when stop collar 58 is first in the first position, but allows the shoulder member to move about the second axis when the stop collar is in the second position.

It should be recognized that first and second mechanisms 48, 56 are described above by way of example. Of course, it is contemplated by the present disclosure for first and second mechanisms 48, 56 to be any mechanism for selectively securing joint 10 in a desired position about first axis 16 and second axis 18, respectively. It should also be recognized that first and second mechanisms 48, 56 are described above in use separate from one another. Of course, it is contemplated by the present disclosure for joint 10 to have one or both of the first or second mechanisms 48, 56.

Also illustrated in the exemplary embodiment of FIGS. 6 through 8, first axis 16 is shown as a virtual axis, namely lacking a pin 30. Here, wheel portion 24 and lugs 28 are configured to rotatably secure the wheel member to first implement 12. For example, each lug 28 can have an inwardly depending arm 66. Lugs 28 can be positioned to receive rim portion 32 of wheel member 24, while arms 66 are positioned to receive hub portion 34. In this manner, wheel member 24 can rotate in lugs 28 in side-to-side direction 20 within arms 66.

It is contemplated by the present disclosure for arms 66 to be positioned such that first axis 16 is defined through the center of wheel member 24. Alternately, it is contemplated by the present disclosure for arms 66 to positioned such that first axis 16 is off-center with respect to the center of wheel member 24.

It should be noted that the terms "first", "second", "third", "upper", "lower", "back", "side", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A two-axis swivel joint comprising:
    a wheel member securable to a first implement so that said wheel member swivels about a first axis, said wheel member having a rim portion with a channel defined therein;
    a shoulder member securable to a second implement, said shoulder member being secured in said channel such that said shoulder member swivels with respect to said wheel member about a second axis; and
    a first mechanism having a first position and a second position, said first mechanism preventing swiveling about said first axis in said first position and allowing swiveling about said first axis in said second position.

2. The two-axis swivel joint as in claim 1, wherein said wheel member is adapted to swivel about said first axis without binding on or interfering with said shoulder member.

3. The two-axis swivel joint as in claim 2, wherein said shoulder member is adapted to swivel about said second axis without binding on or interfering with said wheel member.

4. The two-axis swivel joint as in claim 1, wherein said shoulder member is adapted to swivel about said second axis without binding on or interfering with said wheel member.

5. The two-axis swivel joint as in claim 1, further comprising a second mechanism having a first position and a second position, said second mechanism preventing swiveling about said second axis in said first position and allowing swiveling about said second axis in said second position.

6. The two-axis swivel joint as in claim 1, wherein said first and second axes are off-set from one another.

7. The two-axis swivel joint as in claim 1, wherein said first axis is a virtual axis.

8. A two-axis swivel joint comprising:
    a wheel member securable to a first implement so that said wheel member swivels about a first axis; and
    a shoulder member securable to a second implement, said shoulder member being secured to said wheel member such that said shoulder member swivels with respect to said wheel member about a second axis, wherein the two-axis swivel joint has a first range of motion about said first axis and a second range of motion about said second axis, said second range of motion being over three hundred degrees throughout said first range of motion.

9. The two-axis swivel joint as in claim 8, wherein said first range of motion is over one hundred eighty degrees.

10. The two-axis swivel joint as in claim 8, wherein said wheel member comprising an outer peripheral channel, said shoulder member being secured in said outer peripheral channel such that said shoulder member swivels with respect to said wheel member about said second axis.

11. The two-axis swivel joint as in claim 8, further comprising means for selectively inhibiting and allowing movement about an axis selected from the group consisting of said first axis, said second axis, and any combinations thereof.

12. The two-axis swivel joint as in claim 8, wherein said wheel member is adapted to swivel about said first axis without binding on or interfering with said shoulder member.

13. The two-axis swivel joint as in claim 12, wherein said shoulder member is adapted to swivel about said second axis without binding on or interfering with said wheel member.

14. A two-axis swivel joint comprising:
    a first member securable to a first implement so that said first member swivels about a first axis, said first member having a plurality of notches defined at an outer periphery;
    a second member securable to a second implement, said second member being secured to said first member such that said first and second members swivel with respect to one another about a second axis; and
    a detent moveable between a first position and a second position, said detent being received in one of said plurality of notches in said first position to inhibit movement about said first axis and said detent being free of said plurality of notches in said second position to allow movement about said first axis.

15. The two-axis swivel joint as in claim 14, wherein said first member comprises an outer peripheral channel, said second member being secured in said outer peripheral channel such that said second member swivels with respect to said first member about said second axis.

16. The two-axis swivel joint as in claim 14, wherein said first member comprises a wheel member having a rim portion, said rim portion being securable to the first implement so that said first member swivels about said first axis.

17. The two-axis swivel joint as in claim 16, wherein said first axis is a virtual axis.

18. The two-axis swivel joint as in claim 14, further comprising a stop collar moveable between a first position and a second position, said stop collar inhibiting movement about said second axis in said first position and allowing movement about said second axis in said second position.

* * * * *